(12) United States Patent
Sasaki

(10) Patent No.: US 7,993,421 B2
(45) Date of Patent: Aug. 9, 2011

(54) GAS FILTERING APPARATUS

(75) Inventor: Seiji Sasaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 253 days.

(21) Appl. No.: 12/303,875

(22) PCT Filed: Jun. 6, 2007

(86) PCT No.: PCT/JP2007/061483
§ 371 (c)(1),
(2), (4) Date: Mar. 11, 2009

(87) PCT Pub. No.: WO2007/142274
PCT Pub. Date: Dec. 13, 2007

(65) Prior Publication Data
US 2010/0199616 A1 Aug. 12, 2010

(30) Foreign Application Priority Data
Jun. 8, 2006 (JP) ................. 2006-159803

(51) Int. Cl.
*B01D 50/00* (2006.01)
(52) U.S. Cl. ................. 55/319; 55/385.3; 55/497
(58) Field of Classification Search ............ 55/319, 55/385.3, 418, 497
See application file for complete search history.

(56) References Cited

U.S. PATENT DOCUMENTS

| 4,725,296 A * | 2/1988 | Kurotobi ............ 55/497 |
| 6,761,748 B2 | 7/2004 | Schenk et al. |
| 2003/0126842 A1 | 7/2003 | Schenk et al. |

FOREIGN PATENT DOCUMENTS

| JP | 61 186763 | 11/1986 |
| JP | 7 54109 | 6/1995 |
| JP | 2529456 | 12/1996 |
| JP | 2001 115910 | 4/2001 |
| JP | 2004 520515 | 7/2004 |

* cited by examiner

Primary Examiner — Robert A Hopkins
(74) Attorney, Agent, or Firm — Oblon, Spivak, McClelland, Maier & Neustadt, L.L.P.

(57) ABSTRACT

An air cleaner including a front housing, a rear housing, and a filter. The filter includes a plurality of parallel folds and partitions a pre-filtering chamber and a post-filtering chamber. The air cleaner circulates air, which enters the pre-filtering chamber through an inlet port, to the post-filtering chamber to filter the air. The pre-filtering chamber includes a diffusion zone located outward from an end of the filter in a folding direction of the filter. The inlet port extends in a direction orthogonal to the folding direction of the filter along a plane parallel to the filtering surface of the filter and opens in the diffusion zone.

10 Claims, 1 Drawing Sheet

GAS FILTERING APPARATUS

FIELD OF THE INVENTION

The present invention relates to a gas filtering apparatus for capturing foreign particles such as dust suspended in gas.

BACKGROUND OF THE INVENTION

As described in, for example, Patent Publication 1, an intake system for an internal combustion engine normally includes an air cleaner to capture foreign material such as dust that is suspended in the intake air. The air cleaner includes a housing, the interior of which is partitioned into a pre-filtering chamber and a post-filtering chamber by a filter. The pre-filtering chamber includes an inlet port. Atmospheric gas, namely, air, is drawn into the pre-filtering chamber through the inlet port. The air drawn into the pre-filtering chamber is drawn into the post-filtering chamber through the filter. As the air passes through the filter, the filter captures foreign particles that are suspended in the air. Then, the air passes through an outlet port, which is arranged in the post-filtering chamber, and enters combustion chambers of the internal combustion engine. In this manner, purified air from which foreign particles have been removed by the filter is drawn into the combustion chambers. This prevents problems such as foreign particles from being caught by engine pistons.

As such an air cleaner, a planar filter, which includes a plurality of parallel folds, is often used. In such an air cleaner, when the air in the pre-filtering chamber enters the post-filtering chamber through the filter, the air must be dispersed throughout the entire filtering surface of the filter. Otherwise, most of the air may pass through a particular portion of the filter. In such a case, most of the foreign particles are captured in only the particular portion of the filter. Accordingly, the filtering capacity of the filter cannot be used to its full extent. Further, the pressure loss of the air increases as it passes through the filter.

To solve these problems, for example, the distance between the inlet port and the filter, that is, the volume of the pre-filtering chamber, may be increased as much as possible. This would sufficiently disperse the air in the pre-filtering chamber before the air passes through the filter. Accordingly, the air passes throughout the entire filtering surface of the filter thereby allowing the filtering capacity of the filter to be used to its full extent.

However, such a structure would add limitations to the shapes and layout of the air cleaner and conduits, which are located upstream relative to the air cleaner. Therefore, there may be cases in which there is no way to avoid shortening of the distance between the inlet port and filter. In such cases, an increase in the pressure loss and decrease in the filtering capacity cannot be avoided.

The air cleaner discussed above is used in an intake system for an internal combustion engine. However, the afore-mentioned problems are not unique to air cleaners and may also occur in other types of gas filtering apparatuses.
Patent Publication 1: Japanese Examined Patent Publication No. 7-54109

SUMMARY OF THE INVENTION

It is an object of the present invention to provide a gas filtering apparatus that prevents an increase in pressure loss, a decrease in the filtering capacity of the filter, and an increase in the airflow resistance.

To achieve the above object, one aspect of the present invention provides a gas filtering apparatus including a filter, a pre-filtering chamber, a post-filtering chamber, an inlet port, and an outlet port. The filter is formed to be planar as a whole and includes a plurality of folds extending parallel to each other. The pre-filtering chamber and post-filtering chamber are partitioned by the filter. The inlet port is arranged in the pre-filtering chamber and draws gas into the pre-filtering chamber. The outlet port is arranged in the post-filtering chamber and discharges gas out of the post-filtering chamber. The gas in the pre-filtering chamber is circulated to the post-filtering through the filter to filter the gas. The pre-filtering chamber includes a diffusion zone located outward from an end of the filter in a folding direction of the filter. The inlet port extends in a direction orthogonal to the folding direction of the filter along a plane parallel to the filter and opens in the diffusion zone.

DETAILED DESCRIPTION OF THE PREFERRED EMBODIMENTS

Figure 1:
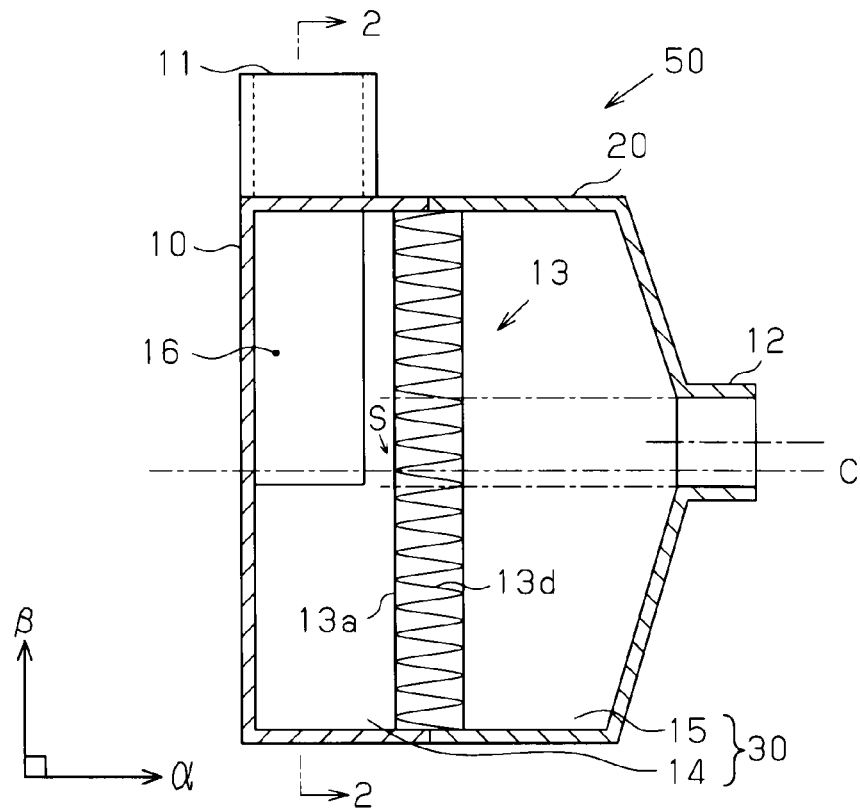
FIG. 1 is a cross-sectional view showing the internal structure of one embodiment of an air cleaner according to the present invention.
Figure 2:
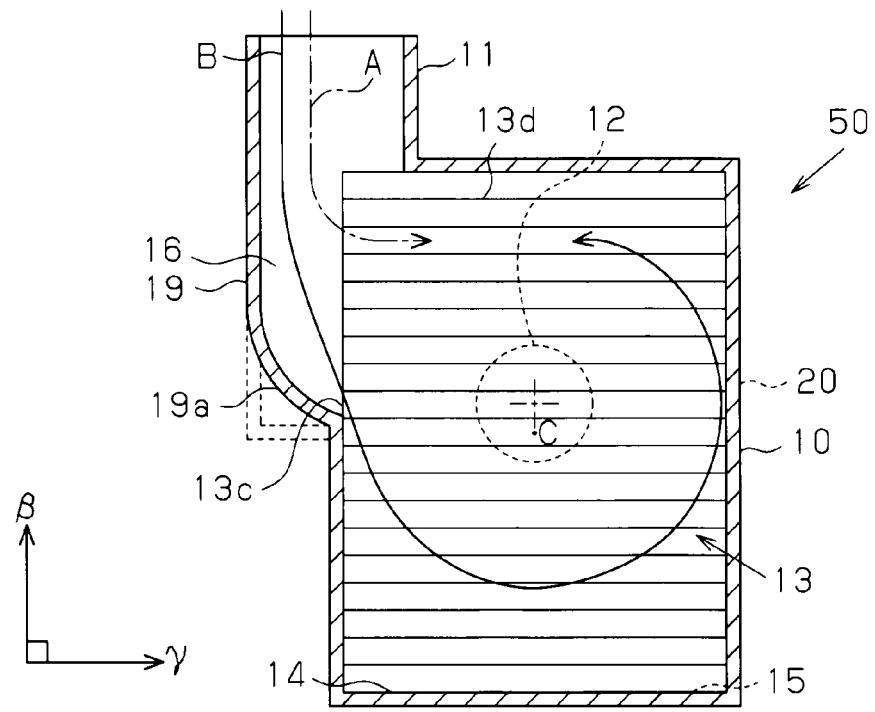
FIG. 2 is a cross-sectional view taken along line 2-2 in FIG. 1.

One embodiment of the present invention will now be discussed with reference to FIGS. 1 and 2. FIG. 1 is a cross-sectional view showing the internal structure of an air cleaner 50 applied to an intake system for an internal combustion engine. FIG. 2 is a cross-sectional view taken along line 2-2 in FIG. 1.

As shown in FIGS. 1 and 2, the air cleaner 50 includes a front housing 10 and a rear housing 20, which form a filtering chamber 30. A planar filter 13 is held between the front housing 10 and rear housing 20. The filter 13 partitions the filtering chamber 30 into a pre-filtering chamber 14 and a post-filtering chamber 15.

The front housing 10 includes an inlet port 11. The pre-filtering chamber 14 is in communication with the atmosphere through the inlet port 11 and an upstream passage (not shown), which is connected to the inlet port 11. The rear housing 20 includes an outlet port 12. The post-filtering chamber 15 is in communication with combustion chambers (not shown) of an internal combustion engine through the outlet port 12 and a downstream passage (not shown), which is connected to the outlet port 12. When the internal combustion engine is undergoing an intake stroke, the pressure in a compression chamber becomes less than the atmospheric pressure. Thus, air enters the combustion chamber through the air cleaner 50. In detail, air is drawn into the pre-filtering chamber 14 through the upstream passage and the inlet port 11. Then, the air passes through the filter 13 and enters the post-filtering chamber 15. The air further enters the combustion chamber of the internal combustion chamber through the outlet port 12 and the downstream passage. When the air passes through the filter 13 and enters the post-filtering chamber 15 from the pre-filtering chamber 14, the filter 13 captures foreign particles such as dust suspended in the air. This filters the air.

The structure of the filter 13 and the operation of the filter 13 when air passes therethrough will now be discussed in detail. As shown in FIGS. 1 and 2, the planar filter 13 includes a plurality of folds 13d. The folds 13d extend parallel to one another along direction γ as viewed in FIG. 2.

When air passes through the filter 13, the air must be sufficiently dispersed beforehand in the pre-filtering chamber 14. Otherwise, the air may pass in a concentrated manner through a particular portion of the filter 13, for example, portion S that is in correspondence with the outlet port 12. In such a case, the filter 13 captures foreign particles only at the particular portion. Thus, the filtering capacity of the filter 13 cannot be used to its full extent. Further, when air passes through only the particular portion of the filter 13, the pressure loss of the air increases when passing through the filter 13.

In this manner, when the pressure loss increases in the air cleaner, the amount of air drawn into the combustion chambers from the atmosphere decreases. This decreases the intake efficiency of the internal combustion engine. Further, when air continuously passes through only the particular portion of the filter 13 for a long time, the filtering capacity of the filter 13 may decrease, and the airflow resistance may increase.

The air cleaner 50 of this embodiment has a structure that solves the above problems in an optimal manner. This structure will now be described.

As shown in FIGS. 1 and 2, the filtering chamber 14 includes a diffusion zone 16. The diffusion zone 16 is defined by a wall 19, which forms part of the front housing 10. Further, the diffusion zone 16 is located outward from one end 13c of the filter 13 in the folding direction of the filter 13.

The wall 19 includes a downstream portion 19a, which has a curved shape so that the flow of air in the diffusion zone 16 is gradually directed toward the filter 13. As shown in FIGS. 1 and 2, the inlet port 11 extends in direction β, that is, in a direction orthogonal to the folding direction of the filter 13 and along a plane parallel to a filtering surface 13a of the filter 13. Further, the inlet port 11 opens in the diffusion zone 16.

The outlet port 12 extends in direction α as viewed in FIG. 1, that is, in a direction orthogonal to the filtering surface 13a of the filter 13. Further, the outlet port 12 is located at a position biased toward the inlet port 11 from the center of the filtering surface 13a in the filter 13 (the location lying along line C in FIG. 1 and indicated by point C in FIG. 1).

The above-described embodiment has the advantages described below.

(1) When the internal combustion engine is undergoing an intake stroke, air is drawn into the diffusion zone 16 of the pre-filtering chamber 14 through the inlet port 11. The air drawn into the diffusion zone 16 then enters a zone in the pre-filtering chamber 14 located outside the diffusion zone 16, that is, a zone facing toward the filtering surface 13a of the filter 13. Then, the air is drawn into the post-filtering chamber 15 through the filter 13. The diffusion zone 16 is located outward from the end 13c of the filter 13 in the folding direction of the filter 13. Thus, air flows quickly from the end 13c of the filter 13 in the folding direction of the filter 13 (as indicated by arrow A in FIG. 2). In this manner, since some of the air flows along the folding direction of the filter 13, pressure loss is prevented from being increased.

Furthermore, the inlet port 11 extends along a plane in a direction orthogonal to the folding direction of the filter 13 and along a plane parallel to the filter 13 (filtering surface 13a). The inlet port 11 also opens in the diffusion zone 16. Accordingly, some of the air drawn from the diffusion zone 16 into the zone facing toward the filtering surface 13a of the filter 13 is swirled along a plane parallel to the filtering surface 13a of the filter 13 as it gradually approaches the filtering surface 13a. The air is ultimately drawn into the filtering chamber 15 through the filter 13 (as indicated by arrow B in FIG. 2). The formation of such a swirling flow disperses air in the pre-filtering chamber 14. Thus, air is prevented from passing through a particular portion of the filter 13 in a concentrated manner. Accordingly, since air does not pass through a particular portion of the filter 13, the filtering capacity is prevented from decreasing and the airflow resistance is prevented from increasing. In this manner, even if the distance between the inlet port 11 and the filter 13 is limited, the pressure loss is prevented from increasing, the filtering capacity of the filter 13 is prevented from decreasing, and the airflow resistance is prevented from increasing.

(2) The downstream portion 19a of the wall 19 has a curved shape so that the flow of air in the diffusion zone 16 is gradually directed toward the filter 13. Thus, air further easily flows along the folding direction of the filter 13. Accordingly, when air passes through the filter 13, the pressure loss is prevented from increasing. Further, the swirling of the air, which is drawn from the diffusion zone 16 into the zone facing toward the filtering surface 13a of the filter 13 along a plane parallel to the filtering surface 13a of the filter 13, is promoted. As a result, the pressure loss is further prevented from increasing, the filtering capacity of the filter 13 is prevented from decreasing, and the airflow resistance is prevented from increasing.

(3) The outlet port 12 is located at a position biased toward the inlet port 11 from the center of the filtering surface 13a of the filter 13. Accordingly, some of the air entering the pre-filtering chamber 14 through the inlet port 11 temporarily flows away from the outlet port 12 due to inertia. As a result, the diffusion of air caused by the swirling of air in the pre-filtering chamber 14 is promoted, and the decrease of the filtering capacity of the filter 13 and the increase of the airflow resistance are prevented in a further optimal manner.

(4) Since the pressure loss does not increase in the air cleaner 50, the intake efficiency of the internal combustion engine is prevented from decreasing, the filtering capacity of the filter 13 is prevented from decreasing, and the airflow resistance is prevented from increasing in an optimal manner. As a result, the performance of the internal combustion engine, such as the engine output, is prevented from being adversely affected.

The above-described embodiment may be modified in the forms described below.

The downstream portion 19a of the wall 19 is curved so that the flow of air in the diffusion zone 16 is gradually directed toward the filter 13. However, as shown by the broken lines in FIG. 2, the downstream portion 19a may include a bottom wall and side wall that extend perpendicular to each other.

The outlet port 12 is located at a position biased toward the inlet port 11 from the center of the filtering surface 13a of the filter 13. However, the outlet port 12 may be located at any position.

In the above-described embodiment, the air cleaner 50 is applied to an intake system for an internal combustion engine. However, the present invention may also be embodied in a gas filtering apparatus applied to other gas circulation systems such as an air conditioner system.

The invention claimed is:

1. A gas filtering apparatus comprising:
a filter formed to be planar as a whole and including a plurality of folds extending parallel to each other;
a pre-filtering chamber and a post-filtering chamber partitioned by the filter;
an inlet port which is arranged in the pre-filtering chamber and which draws gas into the pre-filtering chamber; and
an outlet port which is arranged in the post-filtering chamber and which discharges gas out of the post-filtering chamber, with the gas in the pre-filtering chamber being circulated to the post-filtering through the filter to filter the gas;

wherein the pre-filtering chamber includes a diffusion zone located outward from an end of the filter in a folding direction of the filter and biased toward one side from the center of a filtering surface of the filter in a direction orthogonal to the folding direction of the filter;

the inlet port extends in a direction orthogonal to the folding direction of the filter to a position corresponding to the end of the filter in the folding direction along a plane parallel to the filter, opens in the diffusion zone at the one side from the center of the filtering surface of the filter, and further opens toward the filter in the direction orthogonal to the folding direction of the filter; and the outlet port is located at a position biased toward the one side from the center of the filtering surface of the filter in the direction in which the inlet port extends.

2. The gas filtering apparatus according to claim 1, further comprising:

a wall defining a downstream portion of the diffusion zone and having a curved shape so that the flow of gas in the diffusion zone is gradually directed toward the filter.

3. The gas filtering apparatus according to claim 1, wherein the outlet port extends in a direction orthogonal to a filtering surface of the filter.

4. The gas filtering apparatus according to claim 1, wherein the pre-filtering chamber is in communication with the atmosphere through the inlet port, the post-filtering chamber is in communication with a combustion chamber of an internal combustion engine, and the filter filters the air that is drawn into the combustion chamber.

5. The gas filtering apparatus according to claim 2, wherein the outlet port extends in a direction orthogonal to a filtering surface of the filter.

6. The gas filtering apparatus according to claim 2, wherein the pre-filtering chamber is in communication with the atmosphere through the inlet port, the post-filtering chamber is in communication with a combustion chamber of an internal combustion engine, and the filter filters the air that is drawn into the combustion chamber.

7. The gas filtering apparatus according to claim 3, wherein the pre-filtering chamber is in communication with the atmosphere through the inlet port, the post-filtering chamber is in communication with a combustion chamber of an internal combustion engine, and the filter filters the air that is drawn into the combustion chamber.

8. The gas filtering apparatus according to claim 5, wherein the pre-filtering chamber is in communication with the atmosphere through the inlet port, the post-filtering chamber is in communication with a combustion chamber of an internal combustion engine, and the filter filters the air that is drawn into the combustion chamber.

9. The gas filtering apparatus according to claim 6, wherein the pre-filtering chamber is unobstructed across the entire filtering surface of the filter.

10. The gas filtering apparatus according to claim 1, wherein the diffusion zone overlaps a corner of the filter, as viewed along a direction of flow in the outlet port.

* * * * *